United States Patent
Boullery et al.

(10) Patent No.: US 9,244,777 B2
(45) Date of Patent: Jan. 26, 2016

(54) BALANCED DISTRIBUTED BACKUP SCHEDULING

(71) Applicant: INTERNATIONAL BUSINESS MACHINES CORPORATION, Armonk, NY (US)

(72) Inventors: Didier Boullery, Cedex (FR); Angela Schoergendorfer, Yorktown Heights, NY (US); Peter M. Van De Ven, Yorktown Heights, NY (US); Bo Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 13/782,878

(22) Filed: Mar. 1, 2013

(65) Prior Publication Data

US 2014/0250283 A1 Sep. 4, 2014

(51) Int. Cl.
*G06F 3/06* (2006.01)
*G06F 11/14* (2006.01)

(52) U.S. Cl.
CPC ........ *G06F 11/1464* (2013.01); *G06F 11/1461* (2013.01); *G06F 3/06* (2013.01)

(58) Field of Classification Search
CPC .................................................. G06F 11/1464
USPC ......................................................... 711/162
See application file for complete search history.

(56) References Cited

U.S. PATENT DOCUMENTS

| | | | |
|---|---|---|---|
| 5,495,607 A * | 2/1996 | Pisello et al. ................. | 707/797 |
| 8,090,829 B1 | 1/2012 | Galperin | |
| 2004/0122832 A1* | 6/2004 | Heil .............................. | 707/100 |
| 2008/0114830 A1 | 5/2008 | Welingkar et al. | |
| 2012/0102088 A1 | 4/2012 | Bindal et al. | |
| 2013/0024426 A1* | 1/2013 | Flowers et al. ............... | 707/654 |
| 2013/0262925 A1* | 10/2013 | Dhanalakoti et al. ........... | 714/16 |

* cited by examiner

*Primary Examiner* — Kevin Verbrugge
*Assistant Examiner* — Zubair Ahmed
(74) *Attorney, Agent, or Firm* — F. Chau & Associates, LLC

(57) ABSTRACT

A method for scheduling a backup of digital data includes determining whether a backup has previously been performed within a predetermined period. It is then determined whether a connection to a backup server is available. It is then decided whether to initiate a backup of digital data within a present time slot based at least in part on a randomly generated value when it is determined that a backup has not previously been performed within the predetermined period and it is determined that a connection to the backup server is available. The digital data is backed up to the backup server when it is decided that the data backup is to be initiated.

20 Claims, 3 Drawing Sheets

BALANCED DISTRIBUTED BACKUP SCHEDULING

TECHNICAL FIELD

The present disclosure relates to backup scheduling and, more specifically, to systems and approaches for performing balanced distributed backup scheduling.

DISCUSSION OF THE RELATED ART

Backing up electronic data is an essential component to assuring data integrity for individuals and enterprises alike. Many software and hardware products have been developed to facilitate data backup. It is often beneficial to maintain backup data off-site so that the original data and the backup data are not both vulnerable to a single event of theft or damage. For this purpose, one or more backup servers may be used. The backup server may be a computer system having a relatively large amount of available storage space often embodied as an array of hard disk drives such as a RAID array. The backup server may alternatively be a network attached storage (NAS) device.

One or more client computer systems may be in connection with the backup server, either across a local area network such as a corporate intranet or across a wide area network such as the Internet. Where the client computer connects with the backup server across the Internet, the connection may be through a virtual private network (VPN) or some other means of maintaining data security. One or more client computer systems may also be connected to the backup server by a direct connection such as a USB connection, an eSATA connection, or even an ad-hoc wireless connection.

Each client computer may run backup client software for reading local data, or incremental changes thereof, and sending this data to the backup server for safe keeping. The client software may be customized to establish a backup time slot, which may be, for example, a fixed time of day in which to begin the backup process. The time slot may either be selected by the user of the client computer or may be established by a system administrator.

SUMMARY

A method for scheduling a backup of digital data includes determining whether a backup has previously been performed within a predetermined period. It is then determined whether a connection to a backup server is available. It is then decided whether to initiate a backup of digital data within a present time slot based at least in part on a randomly generated value when it is determined that a backup has not previously been performed within the predetermined period and it is determined that a connection to the backup server is available. The digital data is backed up to the backup server when it is decided that the data backup is to be initiated.

The predetermined period may be one calendar day and determining whether the backup has previously been performed within the predetermined period may include determining whether the backup has previously been performed within a current calendar day. Determining whether the connection to the backup server is available may include determining whether Internet access is available. Determining whether to initiate a backup of digital data within a present time slot based at least in part on a randomly generated value may include generating the random value and comparing the generated random value to a predetermined backup probability table.

The backup probability table may define probabilities for deciding whether to initiate a backup for a plurality of time slots. The probabilities may be predetermined to balance network traffic. The probabilities may be predetermined to balance backup server load. The probabilities may be predetermined to balance Virtual Private Network utilization.

The method may be performed by a client backup utility running on a client computer system. The client computer system may receive the backup probability table from the backup server.

A method for scheduling a data transfer between a first and second computer system includes determining whether a data transfer has previously been performed by the first computer system to the second computer system within a predetermined period. It is then determined whether a connection between the first computer system and the second computer system is available. It is then decided whether to initiate a transfer of data from the first computer system to the second computer system within a present time slot based at least in part on a randomly generated value when it is determined that the data transfer has not previously been performed within the predetermined period and it is determined that the connection is available. The data is transferred from the first computer system to the second computer system when it is decided that the data transfer is to be initiated.

Deciding whether to initiate the data transfer within the present time slot based at least in part on the randomly generated value may include generating the random value and comparing the generated random value to a predetermined transfer probability table.

The transfer probability table may define probabilities for deciding whether to initiate the transfer for a plurality of time slots. The probabilities may be predetermined to balance network traffic. The probabilities may be predetermined to balance load to either the first or second computer system.

A computer program product for scheduling a backup of digital data includes a computer readable storage medium having program code embodied therewith. The program code is readable/executable by a computer to determine whether a backup has previously been performed within a predetermined period, determine whether a connection to a backup server is available, decide whether to initiate a backup of digital data within a present time slot based at least in part on a randomly generated value when it is determined that a backup has not previously been performed within the predetermined period and it is determined that a connection to the backup server is available, and backup the digital data to the backup server when it is decided that the data backup is to be initiated.

Deciding whether to initiate a backup of digital data within a present time slot based at least in part on a randomly generated value may include generating the random value and comparing the generated random value to a predetermined backup probability table.

The backup probability table may define probabilities for deciding whether to initiate a backup for a plurality of time slots. The probabilities may be predetermined to balance network traffic, to balance backup server load, or to balance Virtual Private Network utilization.

The method may be performed by a client backup utility running on a client computer system and the client computer system receives the backup probability table from the backup server.

BRIEF DESCRIPTION OF THE DRAWINGS

A more complete appreciation of the present disclosure and many of the attendant aspects thereof will be readily

DETAILED DESCRIPTION OF THE DRAWINGS

Figure 1:
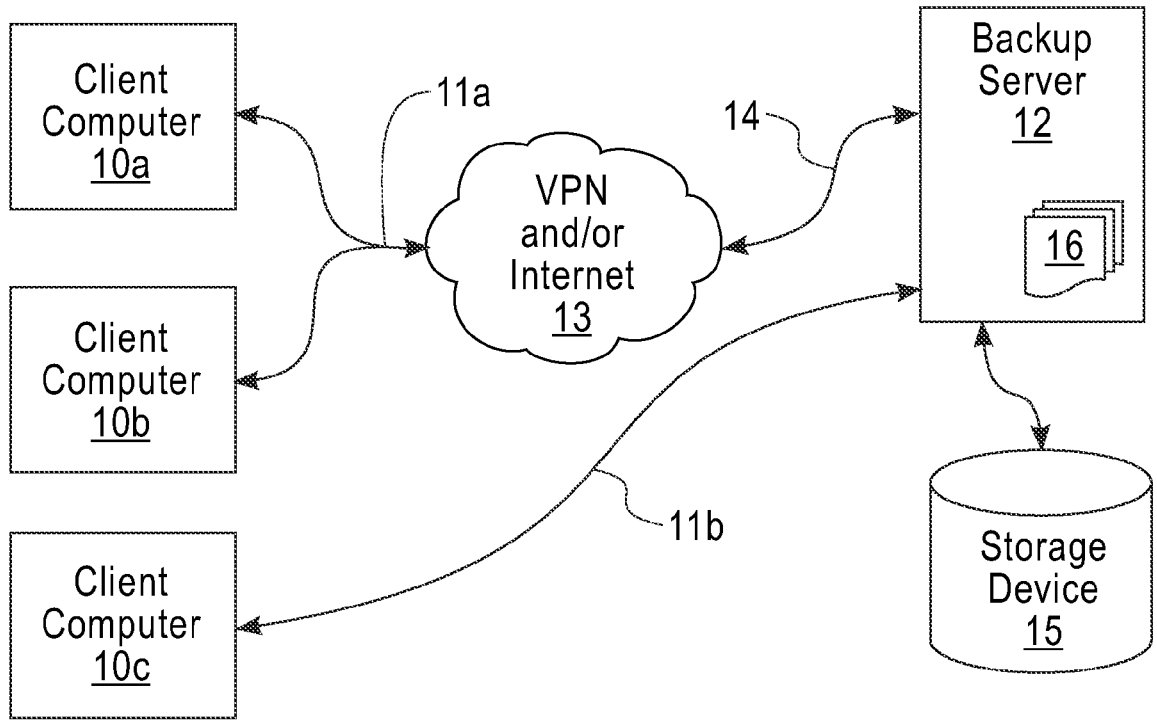
FIG. 1 is a schematic diagram illustrating a system in which exemplary embodiments of the present invention may be implemented.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and approaches for performing backup scheduling. However, rather than establishing a fixed time slot for commencing backups, exemplary embodiments of the present invention utilize software for dynamically selecting a time to initiate backup. This backup selection software may be integrated with backup client software or an operating system scheduler and may continuously or periodically determine at random whether to begin data backup. As is discussed in detail below, a randomly generated value may be at least partially responsible for determining whether a backup operation is to commence. Other factors may be involved as well so that there is an established probability for whether a backup operation will commence at a given time. However, the ultimate determination is still left at least partly to chance.

Because the commencement of backup operations is randomized for all or most clients, backup server workload and/or carried traffic over network connections may be spread out more evenly than would be the case if backups were scheduled solely according to the convenience of the client users. However, by establishing the probabilities for whether a backup operation will commence at a given time, exemplary embodiments of the present invention may balance not only backup server and network load, but may also balance user utility and convenience by preferentially increasing the probability of backups occurring at times that are convenient for each client user.

FIG. 1 is a schematic diagram illustrating a system in which exemplary embodiments of the present invention may be implemented. There may be one or more client computers 10a-c. The client computers may all be affiliated with a single institution that wishes to backup multiple affiliated computer. Alternatively, the client computers may be computers that have subscribed to a cloud-based backup service. The client computers need not be personal computers and may be mainframe computers, servers, desktop computers, laptop computers, tablet computers, smartphones, personal digital assistants (PDAs), personal medial players (PMPs), and the like. The client computers may also be digital appliances, storage devices, databases, and/or data acquisition systems. In fact, any device that may be used to generate, collect or store data may be a client computer, as the phrase is used herein.

As shown, a first client computer 10a and a second client computer 10b are connected to a wide area network such as the Internet 13. This connection 11a may be made through a virtual private network (VPN) and accordingly, the connection 11a may include one or more VPN links. A backup server 12 may also be connected to the Internet 13 via a connection 14. Client computers, such as a third client computer 10c may be connected to the backup server 12 through a local area network connection 11b. The connection 11b may be a TCP/IP network or a direct connection, for example, conforming to USB or eSATA standards. The connection 11b may also include one or more site links so that the local client computer 10c may still access the backup server 12 via the wide area network 13.

The backup server 12 may be connected to a storage device 15. The storage device 15 may have sufficient storage capacity to store all data backed up from all of the client computers. The storage device 15 may be anything from a single hard disk drive to a plurality of distributed server farms. The storage device 15 may either be connected to or incorporated with the backup server 12. The storage device may either be directly connected to the backup server 12 or may be in communication with the backup server via the Internet 13.

The backup server 12 as well as the connections 11a, 11b, and 14, may have a limited capacity to process multiple client computer backups simultaneously and accordingly, exemplary embodiments of the present invention may balance the load on these resources so that maximum benefit may be derived from available hardware resources. This load balancing may be performed by scheduling the backup times of each client computer so that the client computers tend not to all attempt to perform backups at the same time as well as so that the number of backup attempts is low when the extraneous load on connections 11a, 11b or 14 is high, and/or so that the number of backup attempts is high when the extraneous load on connections 11a, 11b, or 14 is low.

While various techniques for balancing backup server load may involve assigning fixed backup time slots for each client computer, these assignments may require assignment from a central source and may not be particularly practical for the users of the client computers. Moreover, some client computers may receive more convenient time slots than other client computers and accordingly, certain client computers with convenient time slots may persistently receive more regular backing up than other client computers which have been assigned less convenient time slots.

Accordingly, exemplary embodiments of the present invention seek to balance load to the backup server and network traffic over the various connections discussed above while maintaining user utility in an equitable way across each user of each client computer. This may be accomplished by each client computer randomly determining whether to commence backing up to the backup server at each time slot that it is in communication with the backup server. However, rather than the chances of commencing backup at each time slot being equal, exemplary embodiments of the present invention may provide a probability table to each client computer, the probability table establishing the probability for commencing backing up at each time slot and this probability may further be dependent on the time since the client computer previously backup up and known characteristics of network traffic.

As can be seen in FIG. 1, the backup server 12 may generate/calibrate the probability tables 16 for each client computer 10a-c. The probability tables 16 may thereafter be distributed to the client computers and stored locally to the client computers.

Figure 2:
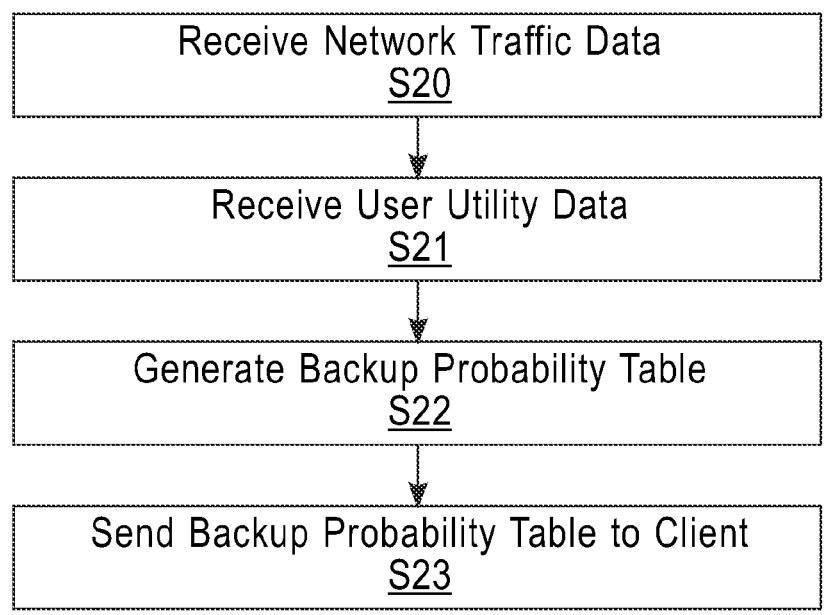
FIG. 2 is a flow chart illustrating a process for generating and/or calibrating probability tables for client computers in accordance with exemplary embodiments of the present invention.

FIG. 2 is a flow chart illustrating a process for generating and/or calibrating probability tables for client computers in accordance with exemplary embodiments of the present invention. The generation/calibration of the probability tables may be performed centrally, for example, by a software application running on the backup server. For this purpose, the backup server, or other centralized application, may periodically receive feedback data from the client computers that may be used for generation/calibration of the probability tables. Alternatively, each client computer may generate/calibrate its own probability table. However, in either event, network traffic data may be received (Step S20). Receiving the network traffic data may include observing the network traffic load on the backup server and its connections at various times throughout the day/week. Alternatively, the observations may be performed by another device and the results received therefrom. As discussed above, the network traffic data may report on which time slots throughout the day/week are subject to high load and which are subject to reduced load. This load may be caused by client computers performing backups to the backup server, however, additionally, this load may be caused by other uses of these shared network resources such as, for example, peak times for emailing or teleconferencing and/or other uses of high network bandwidth.

Similarly, user utility data may be received (Step S21). User utility data may include any information pertaining to the user's ability and/or convenience of performing a backup at a particular time slot. This information may include times when the users of the client computers are more likely to have their computers turned on and in communication with the backup server and times in which the users are most likely to be inconvenienced by the performance of the backup process.

The backup probability tables may thereafter be generated from the received network traffic data and the received user utility data (Step S22). The probability tables may define a probability for commencing a backup at any given time slot. The probability may be made greater for times of reduced network traffic and lessened for times of greater network traffic. Similarly, the probability may be made greater for times of greater utility and lesser for times of lesser utility.

However, the step of receiving user utility data (Step S21) may be optionally omitted and generating the probability tables may optionally not be based on utility data. In such a case, utility may still be achieved by the fact that time slots are not predefined or fixed and backups would only be set to commence at times that the client computer is actually available to be backed up.

User utility data and network data may change over time. For example by the introduction of additional client computers, changes in the extraneous network load, or other external factors. The user utility data and network data may be periodically re-received and based on the new data the backup probability tables may be re-generated.

Time slots used by exemplary embodiments of the present invention may be defined as increments of time in which backups may begin. Their frequency may be set according to the needs of the system. As a check may be performed at each time slot as to whether to commence backups, the time slots may be set relatively large to minimize the resources of the client computer. For example, each hour may be considered a time slot. However, where there are a great many client computer systems, the time slots may be made smaller to avoid too many client computer systems commencing backing up at the same time. Additionally, where the user is less likely to maintain an active connection for an extended period of time, the time slots may be made shorter so that it is more likely that a backup, after commencing, can have sufficient time to complete before the client computer is powered down or otherwise disconnected from the backup server.

The probability table may be used to correspond to a randomly generated number with a decision as to whether to commence backing up. For example, assuming that a uniform random number between 0 and 1 is generated, the probability table may specify, for each time slot, the range of random numbers that will elicit a backup and the range of random numbers that will not elicit a backup. For example, for a given time with a high probability of commencing a backup, the probability table may say to initiate a backup if the random number generated is less than or equal to 0.80 and not initiate a backup if the random number generated is greater than 0.80. The size of the range of values that will commence a backup may be proportional to the determined probability.

After the backup probability tables have been generated (Step S22), each probability table may be sent to its respective client computer (Step S23). While in some exemplary embodiments of the present invention the probability tables may be tailored to the specific load of the client computer, in others, the same probability table may be use by all client computers.

In generating the backup probability tables, the process may allow for different backup probabilities for different client computers depending on such factors as user importance, connection type, and/or time since the previous backup. For example, backup probabilities may increase with time to ensure regular backup, backup probabilities may increase during times of reduced network utilization, and/or backup probabilities may decrease during times of peak network utilization.

Figure 3:
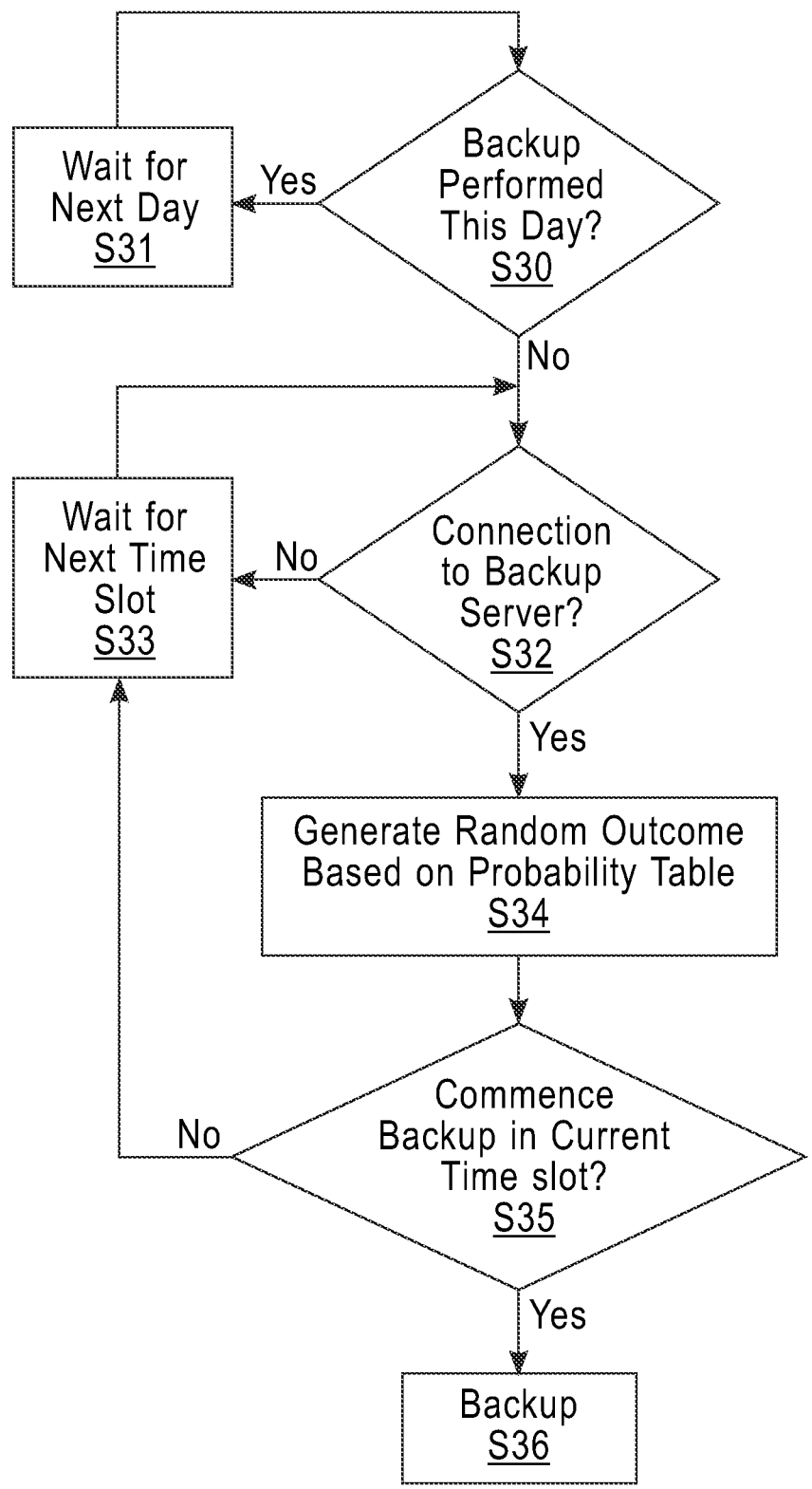
FIG. 3 is a flow chart illustrating an approach for determining whether to commence backups in accordance with exemplary embodiments of the present invention.

FIG. 3 is a flow chart illustrating an approach for determining whether to commence backups in accordance with exemplary embodiments of the present invention. This process may be performed by the client computer, for example, via a backup application running on the client computer. As this process is performed by the client computer, it will not be performed if the client computer is powered down or otherwise in a hibernate state, however, where the client computer is in a sleep state that is capable of running backup software, the process may be performed. First it may be determined whether a backup has already been performed on that day (Step S30). Where it has already been performed on that day (Yes, Step S30), then the process may wait for the next day before trying again (Step S31). Of course, where it is desired that more than one backup be performed in a day, the length of time of this check may be changed. For example, at step S30, it may be checked whether a backup has been performed within the present 12 hour, 6 hour, or 3 hour period.

Where the backup has not already been performed (No, Step S30), it may be determined whether a connection to the backup server exists or can be established (Step S32). If the connection does not exist and cannot be established (No, S33), then the process may wait for the next time slot (Step S33) before trying again. If, however, the connection does exist or can be established (Yes, Step S32), then a random outcome may be generated based on the probability table (Step S34). This may include, for example, generating a random number and referring to the probability table to see if the generated random number is sufficient to commence backing up, given the present time slot. In any event, at step S34 it may be determined whether a backup is to commence based on a random selection that is weighted in accordance with the probability table.

If it is determined that the backup should not commence (No, Step S35), then the process may wait for the next time slot (Step S33) before trying again. If, on the other hand, it is determined that the backup should commence (Yes, Step S35), then the backup may be performed (Step S36).

Each client computer may perform the same process as described above. However, as the process is dependent upon a random selection, the commencement of the backup is automatic, not centrally controlled, and allocation is independent between users.

The backup software on each client computer may be programmed to perform the process described above for determining whether to commence a backup. This may be accomplished, for example, using a backup service, which may be embodied as a Java widget. The backup service may be configured using one or more XML files that establish the system type, the country-specific setup, the network patterns, etc. The backup service may call upon a backup software client when the time is right to commence the backup, for example, by running an appropriate command. The backup service may be installed, for example, from a backup service package repository.

The above-described approach for commencement scheduling need not be limited to commencing backups and exemplary embodiments of the present invention may be applied to the scheduling of any data transfers that may be delay-tolerant and may be particularly useful where the data to be transferred is relatively large and may either affect or be affected by network traffic. For example, exemplary embodiments of the present invention may be applied to data synchronization applications, software updating, databases, bluepages, etc.

As discussed above, the backup probabilities used for populating the probability tables may be predefining in considering backup server usage as well as network load. Exemplary embodiments of the present invention may utilize various algorithms for calculating these backup probabilities. According to one such algorithm, algorithm inputs may include the average extraneous network load per hour $L(t)$, $t=1,\ldots,24$, a number of users N, and the probability that a user is connected in hour t, $c(t)$. For given backup probabilities $v(t,w)$ we can compute the probability that a user that has gone w days without backup in hour t as:

$$q(t, w) = c(t)v(t, w) \prod_{u=1}^{t-1} (1 - c(u)v(u, w))$$

From this, one can determine $M(w)$, the average number of users that have gone w days without a backup, as well as the expected load due to backups in hour t:

$$B(t) = \sum_{i=1}^{\infty} M(i)q(t, i)ia.$$

Here a is the average size of backlog after one day. Given a load-dependent cost function g, we then aim to solve $$\min_{v} g(L(t)+B(t)) \square$$

such that $$M(i) \le \gamma(i).$$

The $\gamma(i)$ represent certain constraints to ensure that users perform backups sufficiently often. We now repeat the above steps until there is a convergence, for example, subsequent repetitions no longer result in changes to the computed backup probabilities. The backup probabilities so computed may then be used to populate the probability tables.

Figure 4:
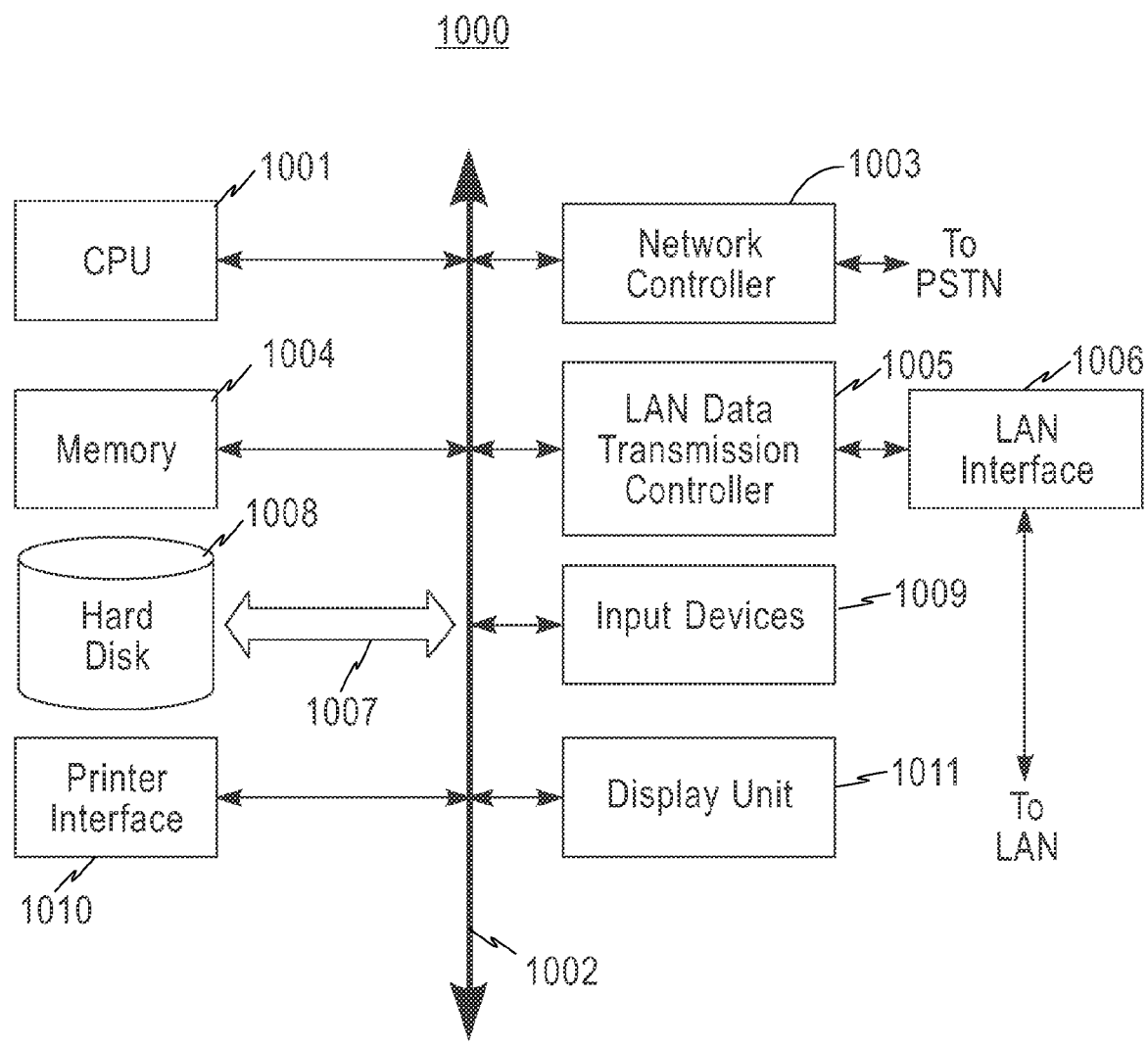
FIG. 4 shows an example of a computer system capable of implementing the method and apparatus according to embodiments of the present disclosure.

FIG. 4 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus to provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for scheduling a backup of digital data, comprising:
    determining whether a backup has previously been performed within a predetermined period;
    determining whether a connection to a backup server is available;
    deciding whether to initiate a backup of digital data within a present time slot based at least in part on a randomly generated value when it is determined that a backup has not previously been performed within the predetermined period and it is determined that a connection to the backup server is available; and
    backing up the digital data to the backup server when it is decided that the data backup is to be initiated.

2. The method of claim 1, wherein the predetermined period is one calendar day and determining whether the backup has previously been performed within the predetermined period includes determining whether the backup has previously been performed within a current calendar day.

3. The method of claim 1, wherein determining whether the connection to the backup server is available includes determining whether Internet access is available.

4. The method of claim 1, wherein deciding whether to initiate a backup of digital data within a present time slot based at least in part on a randomly generated value includes generating the random value and comparing the generated random value to a predetermined backup probability table.

5. The method of claim 4, wherein the backup probability table defines probabilities for deciding whether to initiate a backup for a plurality of time slots.

6. The method of claim 5, wherein the probabilities are predetermined to balance network traffic.

7. The method of claim 5, wherein the probabilities are predetermined to balance backup server load.

8. The method of claim 5, wherein the probabilities are predetermined to balance Virtual Private Network utilization.

9. The method of claim 1, wherein the method is performed by a client backup utility running on a client computer system.

10. The method of claim 9, wherein the client computer system receives the backup probability table from the backup server.

11. A method for scheduling a data transfer between a first and second computer system, comprising:
    determining whether a data transfer has previously been performed by the first computer system to the second computer system within a predetermined period;
    determining whether a connection between the first computer system and the second computer system is available;
    deciding whether to initiate a transfer of data from the first computer system to the second computer system within a present time slot based at least in part on a randomly generated value when it is determined that the data transfer has not previously been performed within the predetermined period and it is determined that the connection is available; and transferring the data from the first computer system to the second computer system when it is decided that the data transfer is to be initiated.

12. The method of claim 11, wherein deciding whether to initiate the data transfer within the present time slot based at least in part on the randomly generated value includes generating the random value and comparing the generated random value to a predetermined transfer probability table.

13. The method of claim 12, wherein the transfer probability table defines probabilities for deciding whether to initiate the transfer for a plurality of time slots.

14. The method of claim 13, wherein the probabilities are predetermined to balance network traffic.

15. The method of claim 13, wherein the probabilities are predetermined to balance load to either the first or second computer system.

16. A computer program product for scheduling a backup of digital data, the computer program product comprising a computer readable storage medium having program code embodied therewith, the program code readable/executable by a computer to:

determine whether a backup has previously been performed within a predetermined period; determine whether a connection to a backup server is available;

decide whether to initiate a backup of digital data within a present time slot based at least in part on a randomly generated value when it is determined that a backup has not previously been performed within the predetermined period and it is determined that a connection to the backup server is available; and backup the digital data to the backup server when it is decided that the data backup is to be initiated.

17. The computer program product of claim 16, deciding whether to initiate a backup of digital data within a present time slot based at least in part on a randomly generated value includes generating the random value and comparing the generated random value to a predetermined backup probability table.

18. The computer program product of claim 17, wherein the backup probability table defines probabilities for deciding whether to initiate a backup for a plurality of time slots.

19. The computer program product of claim 18, wherein the probabilities are predetermined to balance network traffic, to balance backup server load, or to balance Virtual Private Network utilization.

20. The computer program product of claim 16, wherein the method is performed by a client backup utility running on a client computer system and the client computer system receives the backup probability table from the backup server.

* * * * *